United States Patent [19]

Clark et al.

[11] Patent Number: 4,555,698
[45] Date of Patent: Nov. 26, 1985

[54] DETECTING MACHINE TOOL SET-UP ERRORS

[75] Inventors: Frederick Clark; Colin Moore, both of Preston, England

[73] Assignee: British Aerospace Public Limited Company, London, England

[21] Appl. No.: 377,177

[22] Filed: May 11, 1982

[30] Foreign Application Priority Data

May 12, 1981 [GB] United Kingdom ................ 8114467

[51] Int. Cl.[4] ............................................. G08B 21/00
[52] U.S. Cl. .................................... 340/680; 340/508; 340/511; 340/687
[58] Field of Search ................ 340/680, 687, 508, 511

[56] References Cited

U.S. PATENT DOCUMENTS 3,135,951  6/1964  Byrne .................................. 340/511

FOREIGN PATENT DOCUMENTS 2061143  5/1981  United Kingdom ................ 340/680

OTHER PUBLICATIONS

Article "Tech Briefs", in Tooling and Production Magazine (p. 112, Jan. 1981).
Article "Just Announced", in Machinery and Production Engineering (p. 12, Oct. 31, 1971).

*Primary Examiner*—Glen R. Swann, III
*Attorney, Agent, or Firm*—Cushman, Darby & Cushman

[57] ABSTRACT

A tool setting-aid comprising an anodized aluminum "button" and a support therefor is set up at a predetermined datum position on the worktable of a computer controlled machine tool, the machine program including a check cycle which sends the cutting tool around and over the button or, if the tool is oversize or set wrongly, into contact with the button. The button is supplied with electrical current via a cable having a resistor coupled to the button end thereof by an electronic detector circuit which includes a sensor for detecting current increase due to contact between button and cutting tool and a sensor for sensing interruption of such current due to cable breakage or a failure to properly connect it to the setting-aid.

12 Claims, 4 Drawing Figures

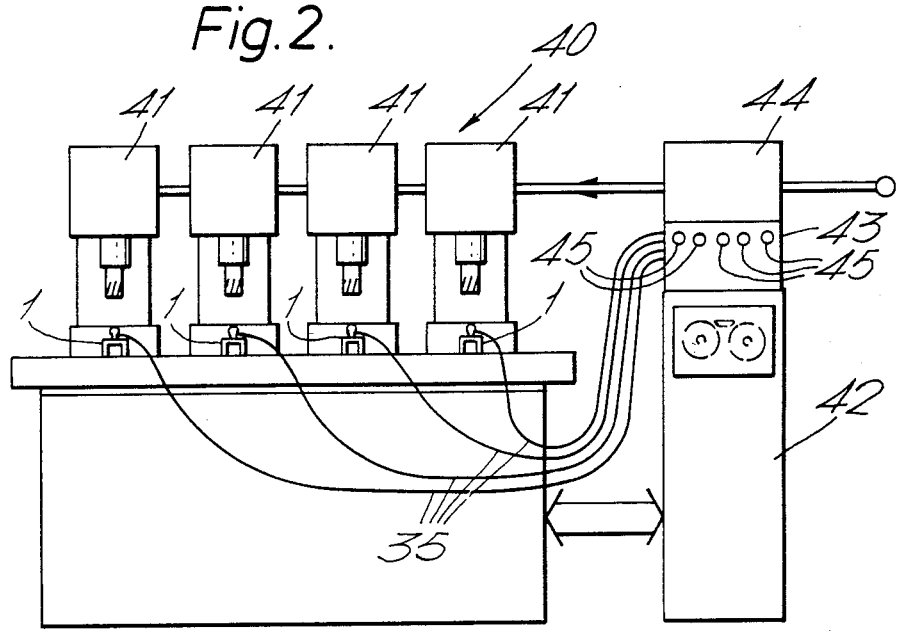
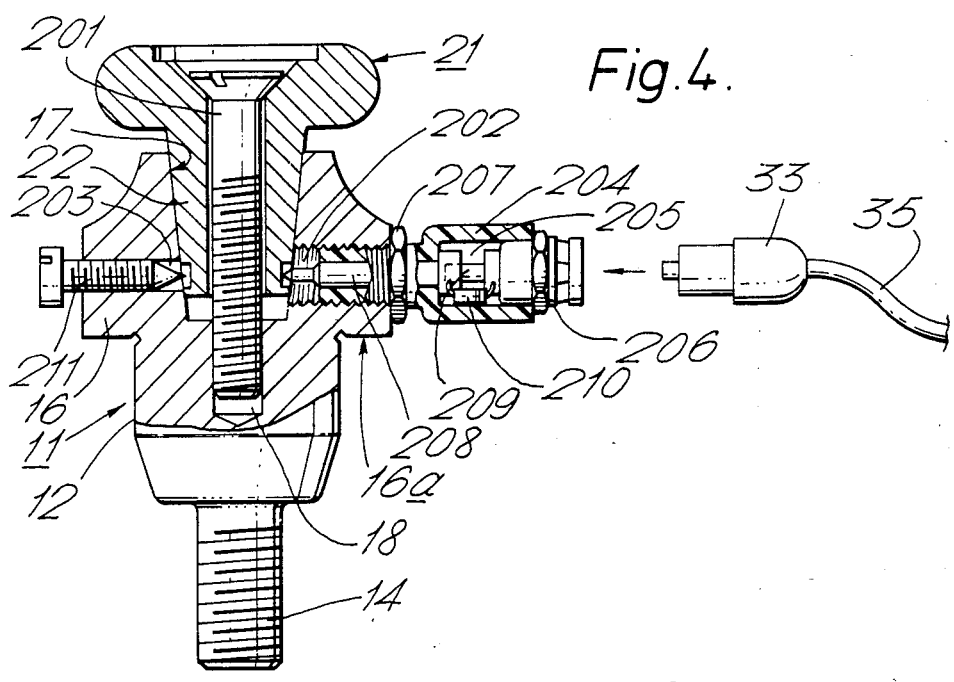

DETECTING MACHINE TOOL SET-UP ERRORS

BACKGROUND OF THE INVENTION

This invention relates to apparatus for checking set-up errors by the operator of a machine tool, particularly but not exclusively a computer controlled machine tool.

Computer controlled machine tools, for example milling and routing machine tools, allow a reduction in the amount of supervision during machining, the operator merely having to set the machine tool up correctly, i.e. by fitting the correct cutter(s), setting the machine initially to the correct datum and so on, whereupon the machining can continue without further manual intervention. However, particularly in an industry such as the aircraft industry where the raw material costs of the workpiece to be machined may be very high indeed, the consequence of an error in setting-up, for example the selection of the wrong cutter or the wrong size of cutter, can be major.

Accordingly, there has been proposed a setting-aid for a computer controlled machine tool, which setting-aid comprises an anodised, approximately mushroom shaped "button" with a support device enabling the button to be fixed at a predetermined position on the worktable of a machine tool, the support device being such that the button is easily replaceable when necessary. Meanwhile, the program for any particular machining operation includes a check sequence which is carried out when the operator has set-up the machine tool and has indicated to the computer that it should begin the machining process. In this check sequence the tool, say an end-mill, of the machine tool is caused to move across the top surface of the button and to circle around it with a small, predetermined clearance. If an oversize cutter has been selected or the datum setting is too low, the cutter will contact the button during the check sequence, cut through the anodised surface thereof and produce an electrical fault signal.

SUMMARY OF THE INVENTION

According to the present invention, there is provided set-up checking apparatus for a machine tool, the apparatus comprising:

a setting-aid including an electrical conductive member and a mounting member for supporting the electrically conductive member at a predetermined position relative to the machine tool, and a detector circuit and conductor means for connecting the conductive member of said setting-aid to the detector circuit, the detector circuit including supply means connected to said conductor means for supplying a signal to said setting-aid via the conductor means, first sensor means connected to said conductor means and operable for sensing a change in said signal indicative of disconnection between the detector circuit and the setting-aid, and second sensor means connected to said conductor means and operable for sensing a change in said signal indicative of contact between said conductive member of the setting-aid and a cutting tool of the machine tool.

BRIEF DESCRIPTION OF THE DRAWINGS

For a better understanding of the invention and to show how the same may be carried into effect reference will now be made, by way of example, to the accompanying drawings, in which:

FIG. 2 shows, diagrammatically, a computer controlled multiple head milling machine with four tool setting-aids connected to error checking apparatus, FIG. 4 is a sectional view of a modified setting-aid.

DESCRIPTION OF THE PREFERRED EMBODIMENTS

Figure 1:
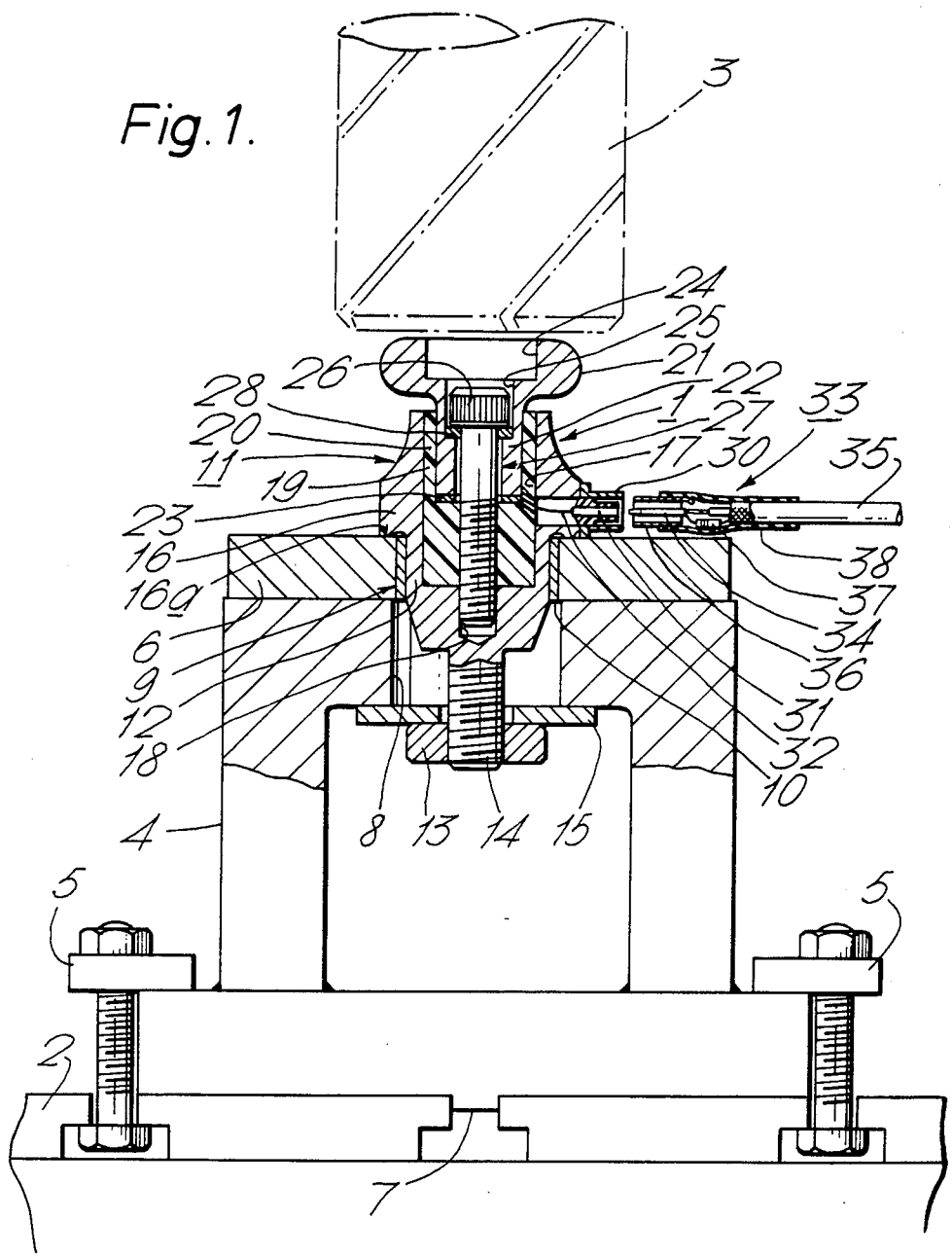
FIG. 1 is a sectional elevation of tool setting-aid mounted on a worktable of a milling machine tool.

The setting aid 1 of FIG. 1 is supported above the worktable 2 of a computer-controlled milling machine (which is not otherwise shown apart from the outline of an endmill cutter 3 fitted to a tool-holder of the machine) by means of a box-shaped jig 4 which is clamped to the worktable 2 by screw-clamps 5 and which has a machined mounting plate 6 attached to its top face. In addition, the bottomface of jig 4 has a locating key 7 extending into one of the T-slots provided in worktable 2. Jig 4 and plate 6 have aligned holes 8 and 9 respectively therein, a machined bush 10 being fitted into the hole 9 to provide an accurate location for setting aid 1. The aid 1 itself comprises a metal mounting member 11 of which a cylindrical portion 12 fits into the bush 10. A nut 13 is screwed onto a downwardly depending threaded extension 14 of portion 12 to engage the bottom of the upper wall of jig 4 via washer 15. Meanwhile, above portion 12, member 11 has a widened portion 16 defining a seating surface 16a which lies on the upper surface of plate 6 around hole 9. Thus, member 11 is fixed in position by nut 13 having been tightened so that seating surface 16a is clamped down onto plate 6. The widened portion 16 may have a hexagonal cross-section in plan-view so that a spanner may be engaged therewith to assist clamping. A central bore 17 is formed in member 11 from the upper surface thereof down to a short way below the level of seating surface 16a and a threaded hole 18 is formed in the floor of this bore. Within the bore 17 is fitted an electrically insulating member 19 having a cup-shaped recess 20 therein and a hole extending from the floor of the recess through the member 19 in alignment with threaded hole 18. A contact "button" 21 which is roughly mushroom shaped in elevation has its lower stem part 22 fitted into the recess 20 with an electrical contact washer 23 between the lower end of stem part 22 and the floor of recess 20. Button 21 is made of aluminium and is hard-anodised all over except for the lower surface of stem part 22. Also, the button 21 is centrally bored so that, from the top, it comprises a comparatively wide recess 24, then a narrower hole 25 which receives the head of an Allen screw 26 and then an even narrower hole 27 for the screw shank to pass down and be engaged with threaded hole 18 via the hole in insulating member 19. Between the head of screw 26 and the floor of the intermediate diameter hole 25 there is an electrically insulating washer 28 through which the screw applies a force to button 21 to clamp it in position. Meanwhile, however, the diameters of holes 25 and 27 are such that the screw 26 does not contact the button 21. As well as being electrically insulating, the material of which the washer 28 and the member 19 are made is both resistant to the cutter lubricants which are generally used in machining and is comparatively hard so that the washer and member remain substantially undeformed by the clamping force exerted by screw 26, the object being to maintain an accurately reproducible height of the upper surface of button 21 even after several replacements of the button by the machine operator. By way of example, the material could be Tufnol or Teflon (Trade Marks).

Attached to one side of the widened portion 16 of member 11 by screws (not shown), there is miniature coaxial connector socket 30 of which the central connector member 31 is connected by a short piece of wire 32 to the contact washer 23, the wire extending through radial holes formed in member 11 and insulating member 19. To the socket 30 there can be connected a corresponding miniature coax-plug 33 of which the central contact 34 is connected to the inner conductor of a screened cable 35 and of which the outer cylindrical contact 36 is connected to the cable screen. When the plug is engaged with socket 30, the cable screen is electrically connected via outer contact 36 of plug 33 and the body of socket 30 to the metal member 11 and hence, effectively, to ground. A miniature resistor 37 is soldered in place between the central contact 34 of plug 33 and the screen of cable 35, the arrangement being supported and insulated by a piece of shrink-sleeving 38 forming the outer cover of the plug.

Referring now to FIG. 2, a complex production machine 40 (shown only diagrammatically) might have several tool heads 41, four being shown, to enable a corresponding number of workpieces to be machined at the same time, the machine tool being controlled by a computer 42. Then a corresponding number of setting aids 1 such as that shown in FIG. 1 may be set up on the machine worktable to check the setting and correct tool selection for each tool head. The cables 35 from the respective setting aids are connected to error detecting apparatus 43 which in turn controls a power supply 44 for the machine tool.

Computer 42 is programmed so that, as well as executing the required machining, it previously (and/or periodically during machining) executes a check cycle in which cutters 3 are caused to make a pass over the respective buttons 21 of the setting-aids 1 so that the lower cutting face of the cutter just clears the upper surface of the button. If the cutter is the wrong size or has been set too low, or if other machine settings are such as to give the effect of too low a cutter setting, then the cutter 3 will contact the button, cut-through the anodising and hence connect the inner conductor of cable 35 to ground. The apparatus 43 senses such grounding and in turn controls power supply 44 so as to cut-off the power supply to the machine tool. Apparatus 43 comprises a front-panel with a series of lamps 45 which are lit to indicate various fault conditions. As well as a straight pass to detect incorrect height settings, the check cycle may include moving each cutter 3 around the respective button 21 with a predetermined clearance between the cutter and the periphery of the button so as to detect an incorrect cutter diameter selection. Machining operations involving dovetail cutters can be checked by a cycle which moves the cutter so that it would just clear a portion of the underside of the mushroom shaped periphery of the button.

It will be appreciated that FIG. 2 is given only by way of example. As possible modifications, there might be more or fewer tool holders to the machine tool and correspondingly more or fewer setting-aids, the number of setting-aids may be different to the number of tool heads (for example, two aids may be used for a single head machine to give a double-check), the several setting-aids may be set-up on respective different machine tools controlled by the same or different computers, instead of controlling the overall machine tool power supply 44, the apparatus 43 may only be arranged to control part of the supply, for example that to the tool slides, or may feed error detection signals direct to the computer so that the computer carries out any evasive action required. Obviously, the check cycle and tool movements therein are adapted as required to the particular machine operation (which may not even be milling of course).

Figure 3:
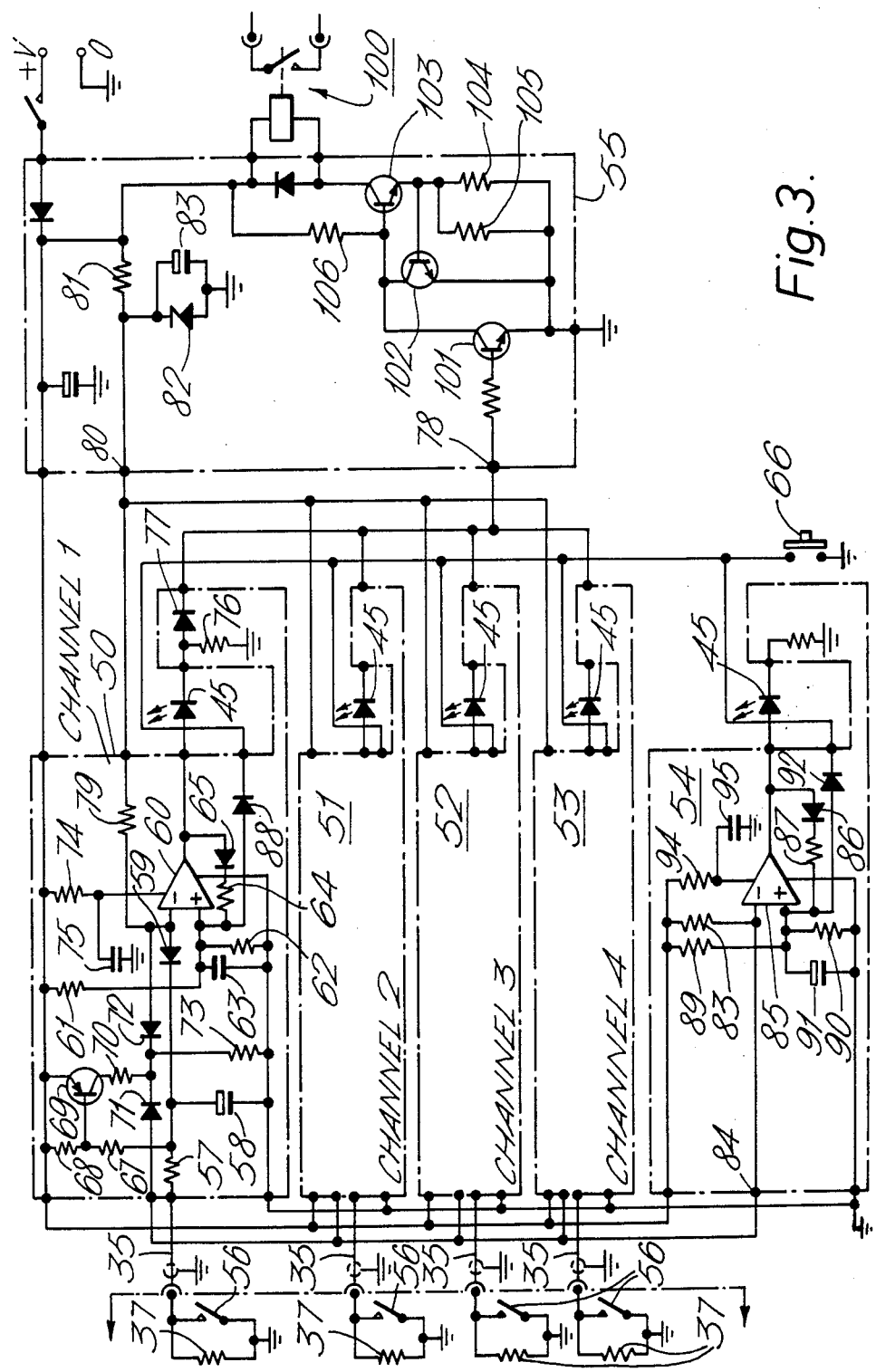
FIG. 3 is a simplified diagram of the error checking apparatus of FIG. 1.

Referring now to FIG. 3, the apparatus 43 comprises a series of printed circuit boards (not shown) carrying the respective circuits enclosed by dashed-line boxes 50 to 55. The circuits 50 to 53 are associated with respective ones of the four setting-aids shown in FIG. 2 and are identical so only the circuit 50 is drawn. Circuit 54 is a supervisory circuit which senses a breakage of any of the cables 35 or a failure by the operator to connect any of the setting aids properly to the apparatus 43. Circuit 55 is an output circuit which receives fault signals from the circuits 50 to 54 and operates a relay 100 of which the contacts control the power supply device 44. Each of the circuits 50 to 54 is associated with one of the front-panel lamps 45 which, as can be seen in FIG. 3, comprise respective light-emitting diodes. If contact occurs between a button 21 of one of the setting-aids 1 and a cutter 3, the lamp associated with the corresponding one of the circuits 50 to 53 will light and the relay contacts will open to cause supply 44 to switch off. If a cable 35 breaks or is disconnected, the lamp of the corresponding circuit 50 to 53 and the lamp for circuit 54 will both light while the relay contacts again open to cut-off the machine supply. The circuits are reset by a common, normally-open push button switch 66.

Each setting-aid 1 is shown in FIG. 3 as the resistor 37 in parallel with a switch 56 which is not physically present but which represents the switching action given by the possible contact between cutter 3 and button 21. Cables 35 from the setting-aids 1 are connected to respective ones of the circuits 50 to 53. As shown for circuit 50, the inner conductor of the appropriate cable 35 leads, via a transient rejecting integrator comprising series resistor 57 and parallel capacitor 58, and via a series diode 59, to the inverting input of a comparator amplifier 60. The non-inverting input of the amplifier 60 is connected to the tap of a potential divider comprising resistors 61 and 62 connected between positive and ground voltage supply rails +V and O respectively of the circuit, there being a bypass capacitor 63 in parallel with resistor 62. The non-inverting input is also connected via resistor 64 and diode 65 to the amplifier output and, along with the non-inverting inputs of the amplifiers in the circuits 51 to 53, via respective diodes 88 to one side of the "reset" switch 66 of which the other side is grounded. The amplifier side of resistor 57 is connected via resistors 67 and 68 to the positive supply rail and a transistor 69 has its base connected to the interconnection point between resistors 67 and 68, its emitter connected to the positive supply rail and its collector connected via resistor 70 to the point of connection between the cathodes of two diodes 71 and 72 and one side of a resistor 73 of which the other side is grounded. Drive power to amplifier 60 is provided from the positive supply rail via resistor 74, the drive being decoupled by capacitor 75.

The anode of each light-emitting diode lamp 45 associated with one of the circuits 50 to 53 is connected to the output of the corresponding amplifier 60 while the cathode of each such lamp is connected via a resistor 76 to ground and via a diode 77 to a common input 78 of circuit 55.

The anode of diode 72 in circuit 50 is connected to the inverting input of amplifier 60 and via a resistor 79 to a common output 80 of circuit 55. The corresponding resistors 79 of the circuits 51, 52 and 53 are also connected to this terminal 80 of circuit 55 and there is provided here an intermediate drive voltage stepped down from the positive rail voltage +V by resistor 81, Zener diode 82 and smoothing capacitor 83.

The anodes of diode 71 and the corresponding diodes in circuits 51 to 53 are connected to a common input 84 of circuit 54 which input leads to the inverting input of comparator amplifier 85 in circuit 54. The output of amplifier 85 is connected to the anode of the lamp 45 associated with circuit 54 and also via diode 86 and resistor 87 to the non-inverting input of the amplifier, this non-inverting input also being connected to a bias network comprising resistors 89 and 90 and capacitor 91, and to the switch 66 via diode 92. The inverting input of amplifier 85 is biassed by resistor 83 and the amplifier receives a drive supply via resistor 94, the supply being decoupled by capacitor 95.

In operation, while each switch 56 is open and each resistor 37 properly in circuit, sufficient current is drawn via resistors 68, 67, 57 and 37 to maintain the potential at the base of transistor 69 sufficiently below that of its emitter for the transistor to be conductive. The cathodes of diodes 71 and 72 are therefore high and the diodes cut-off. Meanwhile the potential at the inverting input of amplifier 60, supplied via resistor 79 from terminal 80, is higher than that at the non-inverting input of the amplifier so the amplifier output stays low. Diode 59 is also "off".

If the switch 56 associated with circuit 50 closes, i.e. if the milling cutter 3 contacts button 21 of the corresponding setting-aid, yet more current is drawn through resistors 68 and 67 so transistor 69 stays on. Nevertheless the potential at the cathode of diode 59 falls so this diode turns on and, in turn, the potential at the inverting input of amplifier 60 falls. The output of amplifier 60 therefore goes high and the amplifier latches up in this state due to the positive feedback effect of diode 65 and resistor 64.

On the other hand, if switch 56 stays open but the path to ground through resistor 37 is opened, due to the cable 35 being broken or not being connected to the setting-aid 1, no current is drawn through resistors 68 and 67 so transistor 69 switches off and diodes 71 and 72 turn on. The turning on of diode 72 pulls down the inverting input of amplifier 60 so the amplifier output again latches high. Meanwhile, the turning-on of diode 71 pulls down the inverting input of amplifier 85 in circuit 54 so the output of this amplifier also latches high, the amplifier being provided with a positive feedback path similar to that for the amplifier 60.

When the output of any amplifier in circuits 50 to 54 goes high the corresponding lamp 45 lights. In addition, current flows via any lit lamp 45 in one of the circuits 50 to 53 via the corresponding diode 77 into the terminal 78 of circuit 55. This current switches on a transistor 101 which in turn causes an amplifier comprising transistors 102 and 103 and biassing resistors 104, 105 and 106 to de-energise the coil of relay 100.

Operation of reset switch 66 removes the latch-up condition of the amplifiers by pulling down the potential on the non-inverting inputs thereof.

The ability of the apparatus 43 to detect an improper connection of a cable 35 to the corresponding setting-aid is due to the fact that the cable screen and hence the resistor 37 is grounded only via the coax-socket on the setting-aid itself. Thus, if the plug 30 is not connected to the socket the ground connection is removed. As an alternative, the cable screen could be grounded elsewhere, say at the corresponding circuits 50, 51, 52 or 53 and then, so that failure to make proper connections as well as cable breakage can be detected, the resistor 37 could be mounted within the setting-aid instead of in the plug 30, for example in a hole formed in the insulating member 19 and electrically connected between the member 11 and the contact washer 23.

For some machine tools, it may be desirable to make a special provision to ensure a good ground connection through the cutter and tool head, for example by providing say a brush arrangement contacting the rotating shaft of the tool head.

The setting-aid 1 of FIG. 1 could be modified as shown in FIG. 4. As before, the setting-aid of FIG. 4 comprises a metal mounting member 11 having a cylindrical portion 12 for fitting into the bush 10 of FIG. 1, a threaded extension 14 for receiving the nut 13 of FIG. 1, and a widened portion 16 above portion 12 to define a seating surface 16a for location on the upper surface of plate 6 in FIG. 1. Again, the member 11 has a central bore 17 having a threaded hole 18 in the floor thereof. Unlike FIG. 1 however, the bore 17 in FIG. 4 tapers so that it becomes narrower towards its floor. Meanwhile, the stem part 22 of the mushroom-shaped contact button 21 is also tapered and dimensioned to fit directly into the bore 17 without any intermediate insulating member. Instead, the insulation between the button and the member 11 is provided by the anodising of the surface of the button—in this case, the anodising is preferably applied to the entire surface of the button, i.e. including the lower face of its stem part. As before, the button is secured within the member 11 by a screw engaging the threaded hole 18. However, instead of a metal Allen screw 26 as in FIG. 1, the securing screw 201 of FIG. 4 is made of Nylon so as to prevent the possibility of electrical connection between the button and the member 11 being made therethrough.

The widened portion of member 11 in FIG. 4 is formed with two lateral threaded holes 202 and 203. The hole 202 has engaged therein a Nylon threaded member 204 which is fixed against disengagement due to vibration by a lock nut 207 and which itself has a central bore therethrough. An outer wider portion 205 of this bore is adapted, for example by being threaded, to receive a small proprietary coaxial connector socket 206. Such sockets, and the matching plugs, are widely available and the detailed design of the member 204 will obviously be done having regard to the particular socket chosen. By way of example however, one suitable socket with a threaded body is obtainable from the firm Lemo U.K. Limited. A narrower inner portion of the bore through member 204 supports an electrical contact pin 208, the headed end of which pin is soldered to the central conductor terminal 209 of the socket 206. The other end of the pin 208 is pointed and protrudes from the inner end of the member 204 so that, as this member is screwed home into hole 202, the pointed end of the pin 208 penetrates the anodised surface of button 21 and makes electrical contact therewith. A small 51 k.ohm resistor 210 within the bore portion 205 has its leads soldered one to the head of pin 208 and the other to the outer screen terminal, the body in this particular case, of the socket 206. The resistor 210 performs the function which in FIG. 1 is performed by the resistor 37 fitted in the plug connector 33 and as described with reference to FIG. 3. With the FIG. 4 arrangement, no resistor is required in the plug 33 so that this item can be more robust and, in addition, the supervisory circuit 54 of FIG. 3 is now able to detect a condition in which the plug on the lead from apparatus 43 has been inserted in socket 206 sufficiently to provide a connection between the screen contacts of the plug and socket but has not been pushed fully home so as to provide central conductor contact.

The hole 203 in member 11 has engaged therein a metal screw 211 with a pointed end which, when the screw is fully entered, penetrates the anodising of button 21 to provide a connection between the button and member 11. Thus, this screw enables the arrangement to be tested—after such a test, the screw is withdrawn a little as shown or could be removed altogether.

As will be appreciated, the modified arrangement of FIG. 4 may provide a more positive height location of the button 21 with reference to the member 11.

We claim:

1. Set-up checking apparatus for a machine tool, the apparatus comprising:
   a setting-aid including an electrically conductive member and a mounting member for supporting the electrically conductive member at a predetermined position relative to the machine tool, and
   a detector circuit and conductor means for connecting the conductive member of said setting-aid to the detector circuit, the detector circuit including supply means connected to said conductor means for supplying a signal to said setting-aid via the conductor means, first sensor means connected to said conductor means and operable for sensing a change in said signal indicative of disconnection between the detector circuit and the setting-aid, and second sensor means connected to said conductor means and operable for sensing a change in said signal indicative of contact between said conductive member of the setting-aid and a cutting tool of the machine tool.

2. Apparatus according to claim 1, wherein said conductive means comprises a flexible cable having two conductive paths, one member of a plug and socket connector being connected to one end of the cable for engagement with the the other member of the plug and socket connector, which other member is attached to the setting-aid, there being a resistor connected between the conductive paths of the cable in the region of said one member of the plug and socket connector, and said first sensing means being operable for sensing a reduction in current flow through said resistor means and the second sensor means being operable for sensing in increase in current flow through the cable.

3. Apparatus according to claim 1, wherein said setting-aid comprises a resistor connected to said electrically conductive member.

4. Apparatus according to claim 1, wherein said detector circuit comprises a comparator amplifier connected to said first and second sensor means, said supply means is operable for supplying a current to said conductor means via resistor means, said first and second sensor means are operable for sensing voltages produced across said resistor means by said current and for thereby sensing a decrease and an increase respectively of said current and for then producing a change in an input signal to said comparator amplifier.

5. Apparatus according to claim 4, wherein said amplifier is connected to operate a visual fault indicating device.

6. Apparatus according to claim 4, wherein said amplifier is connected to control an output circuit including an electromagnetic relay arranged for cutting-off an electrical supply to the machine tool and amplifier means connected to the coil of the relay for operating the relay.

7. Set-up checking apparatus for a machine tool, the apparatus comprising:
   a setting-aid including an electrically conductive member, a mounting member for supporting the electrically conductive member at a predetermined position relative to the machine tool, and electrically insulative material positioned for ensuring electrical insulation of said conductive member from said machine tool, and
   a detector circuit and electrical signal conductor means for connecting the conductive member of said setting-aid to the detector circuit, the detector circuit including signal sypply means connected to the signal conductor means for supplying an electrical signal via the signal conductor means to said setting-aid, which signal has a value dependent upon whether said conductor means is properly or improperly connected to said setting-aid and upon whether contact has occurred between said conductive member of the setting-aid and a cutting tool of the machine tool, and the detector circuit further comprising signal comparator means connected to the signal supply means and operable for sensing values of said signal indicative of said conductor means being improperly connected to said setting-aid and indicative of the occurrence of said contact between said conductive member and said cutting tool.

8. Set-up checking apparatus for a machine tool, the apparatus comprising:
   a setting-aid including an electrically conductive member having a breachable electrically insulating surface coating thereon and a mounting assembly for supporting the electrically conductive member at a predetermined position on the structure of a machine tool but electrically insulated from said structure, said position being able to be reached by the cutter of the machine tool,
   a supply cable comprising an electrical current conducting path defining element which, at one end of the cable, is connected via disengageable coupling means to the electrically conductive member of said setting aid,
   a resistor which is positioned at least near said one end of said cable and said setting aid and which is connected for providing a resistive path between said electrically conductive member of the setting-aid and the structure of the machine tool, and
   a set-up fault sensing unit including, both connected to said electrical current conducting element of the cable at the other end of the cable, supply means for supplying electrical current to the setting-aid via the current conducting element, and comparator means for sensing a drop in the value of said current indicative of said cable being or becoming improperly connected to the setting-aid, and for sensing an increase in the value of said current indicative of breaching of said surface coating and consequent contact with said electrically conductive member of the setting-aid by said cutter of the machine tool.

9. Apparatus according to claim 8, wherein:

said cable comprises two electrical current conducting path defining elements, said disengageable coupling means comprises two interengageable parts each having two electrical contact portions, the two contact portions of one part coming into contact with respective ones of the two contact portions of the other part when the two parts are engaged, one of said parts of the coupling means is fixed to the setting-aid with its two electrical contact portions connected respectively to said conductive member and to an electrically-conductive, machine tool engaging portion of said mounting assembly, the other of said two parts is fixed to said one end of the cable with its two electrical contact portions connected to the two path defining elements of the cable, and said resistor is fixedly connected between the two path defining elements of the cable at said one end of the cable.

10. Apparatus according to claim 8, wherein said resistor constitutes a part of said setting-aid and is fixedly connected between the electrically conductive member of the setting-aid and an electrically conductive machine tool engaging portion of the mounting assembly.

11. Apparatus according to claim 8, wherein said comparator means is connected to control machine tool drive energy switch means.

12. Apparatus according to claim 11, wherein said comparator means comprises a first comparator circuit operable to sense both an increase and a decrease in said current and a second comparator operable only for sensing a decrease in said current, and wherein said fault sensing unit comprises first and second visual indicator devices connected to be controlled by respective ones of the first and second comparators, the first comparator being also connected to control said machine tool drive energy switch means.

* * * * *